United States Patent

Feasey et al.

[11] 4,267,304
[45] May 12, 1981

[54] AROMATIC COPOLYESTERS CAPABLE OF FORMING AN ANISOTROPIC MELT

[75] Inventors: Ronald G. Feasey, Knebworth; Brian P. Griffin, St Albans, both of England

[73] Assignee: Imperial Chemical Industries Limited, London, England

[21] Appl. No.: 58,442

[22] Filed: Jul. 18, 1979

[30] Foreign Application Priority Data

Jul. 31, 1978 [GB] United Kingdom ............... 31763/78

[51] Int. Cl.$^3$ ...................... C08G 63/60; C08G 63/66; C08G 63/68
[52] U.S. Cl. .................................... 528/193; 528/173; 528/190; 528/191; 528/206; 528/271
[58] Field of Search ............... 528/193, 206, 173, 190, 528/191, 271

[56] References Cited

U.S. PATENT DOCUMENTS

| | | | |
|---|---|---|---|
| 2,696,481 | 12/1954 | Schneider | 528/206 |
| 3,039,994 | 6/1962 | Gleim | 528/206 |
| 3,767,621 | 10/1973 | Suzuki et al. | 528/206 |
| 4,067,852 | 1/1978 | Calundann | 528/193 |
| 4,075,262 | 2/1978 | Schaefgen | 260/47 C |
| 4,083,829 | 4/1978 | Calundann | 260/47 C |
| 4,130,545 | 12/1978 | Calundann | 528/193 |
| 4,161,470 | 7/1979 | Calundann | 528/206 |

FOREIGN PATENT DOCUMENTS 344034 11/1921 Fed. Rep. of Germany.
2721787 11/1977 Fed. Rep. of Germany.

Primary Examiner—Lester L. Lee
Attorney, Agent, or Firm—Cushman, Darby & Cushman

[57] ABSTRACT

An aromatic copolyester capable of forming an anisotropic melt containing up to 75 mole % of recurring units of formula

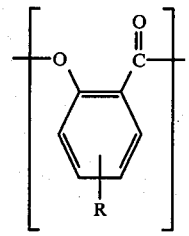

wherein R may be hydrogen, chlorine, bromine or alkyl groups containing from 1 to 4 carbon atoms.

9 Claims, No Drawings

AROMATIC COPOLYESTERS CAPABLE OF FORMING AN ANISOTROPIC MELT

This invention relates to aromatic polyesters and in particular to aromatic polyesters containing units derivable from o-hydroxybenzoic acids and their derivatives.

There has been considerable interest recently in synthetic polyesters capable of forming anisotropic melts. A major objective of these studies has been to produce polyester fibres which have extremely high strength in comparison with fibres obtainable from, for example, poly(ethylene terephthalate). Typical aromatic polyesters of this type are disclosed in U.S. Pat. Nos. 3,991,013, 3,991,014, 4,066,620, 4,075,262, German patent applications 2 721 786 and 2 721 787, Belgian patents 855 246 and 855 247 and Japanese Pat. No. 43-223. The aromatic polyesters disclosed in these patents and applications differ from the known aromatic polyesters, which tended to decompose near to their melting points, in being easier to melt process by conventional melt processing procedures. This greater ease of processing is believed to be attributable to the formation of an ordered melt when the melt is raised to a particular temperature range in which the polymer molecules become aligned rather than randomly disposed in the melt. However, these high performance polyesters of the prior art are still materials of relatively high melting point and additionally, because of the high cost of some of the starting materials, are expensive. It would be desirable to modify these high performance polyesters by reducing the melting point still further without destroying the desirable anisotropic melt forming characteristic. Although such materials would have the advantage of lower processing temperatures they would not be expected to have the high temperature performance of the prior art polyesters. They would nevertheless be suitable for many applications, particularly as engineering plastics having a moderate continuous service temperature. A further desirable objective is a reduction in cost of the polyester.

It has now been found that aromatic copolyesters can be produced which are capable of forming anisotropic melts and which have the advantages outlined above.

Accordingly, there is provided an aromatic polyester characterised in that it is capable of forming an anisotropic melt and contains up to 75 mole % of recurring units of formula:

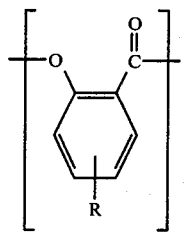

wherein R may be hydrogen, chlorine, bromine or alkyl groups containing from 1 to 4 carbon atoms.

A useful lowering of melting point can be obtained with as little as 5% of units of the specified formula. The amount of such units will depend on such factors as the degree of lowering of melting point that is required and the intended application for the invention and may typically constitute about 50 mole % of the polyester. It is preferred, mainly for reasons of cost, that the units are residues in which R is hydrogen.

By "capable of forming an anisotropic melt" is meant either that the copolyesters form such melts when heated to a particular temperature range or can be induced to form such a melt by the application of shear to the melt. The latter state is characterised by the persistence of the anisotropic condition for a period of a second or two after the melt ceases to be sheared. This distinguishes it from the well-known observation that a poly(ethylene terephthalate) melt will exhibit order when sheared by passing the melt through a tube. Such order disappears immediately the melt ceases to be sheared.

The copolyesters of the invention can be shown to exhibit anisotropic melt behaviour by examining the appearance of the copolyesters under crossed polarisers as the copolyesters are heated up to and above temperatures at which the polymers flow. Optically anisotropic materials have the property of causing light to be transmitted when viewed with such an optical system. The melts are also sometimes turbid, show opalescence or may even whiten under shear. The observance of such a phenomenon indicates substantial alignment or other cooperative alignment of the polyester chains in the melt (hereinafter termed "liquid crystal formation"), from which it can be assumed that the melts would very often have much lower viscosities than isotropic melts of the same materials with randomly distributed polymer chains.

The invention also includes anisotropic melts of the copolyesters of the invention and shaped articles formed from these melts.

The other units forming the polyester may be the constituents detailed in the prior art patenting hereinbefore referred to or, in general, constituents selected from dihydric phenols, aromatic and cycloaliphatic dicarboxylic acids, hydroxyaryl carboxylic acids and their polyester forming derivatives.

In a preferred system the other units are derived solely from other hydroxyaryl carboxylic acids of formula:

HO—A—COOH wherein A is a divalent aryl radical comprising one or more fused or separate aromatic rings and wherein the hydroxyl and carboxyl groups are separated by at least three carbon atoms. Preferably, the hydroxyl and carboxyl groups are in para relationship in single or multiring systems and have their valences parallel and oppositely directed in condensed ring systems. A typical polyester of the invention capable of showing anisotropic melt behaviour is the polyester having recurring units of formulae:

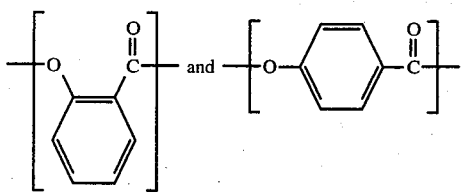

wherein the mole ratio of ortho-substituted residues to para-substituted residues is between 5:95 and 75:25.

In view of the current theories (see, for example, the paper entitled Liquid Crystal Polymers, II Preparation and Properties of Polyesters Exhibiting Liquid Crystalline Melts by Macfarlane, Nicely and Davis presented at the 8th Biennial Polymer Symposium in November 1976 at Key Biscayne and published in Volume 2 of "Contemporary Topics in Polymer Science", pages 109 to 141, 1977, Plenum Press, New York) which emphasize the importance of maintaining substantial linearity of the polymer chain in order to achieve liquid crystal behaviour, it is surprising that polyesters containing as much as 75 mole % of residues or the o-oxycarboxy substituted material have the property of forming anisotropic melts.

A further aspect of the invention is the very significant modification of the properties of the homopolyester of p-hydroxybenzoic acid which can be achieved by the inclusion of relatively small molar proportions of the o-substituted hydroxybenzoic acid. Thus, although homopolyesters and copolyesters of p-hydroxybenzoic acid have been commercially available their progress in the market-place have been hampered by the difficulties in fabricating the polymers. The present invention enables copolyesters containing major proportions of p-hydroxybenzoic acid residues to be produced which are more readily processable.

Alternatively, in addition to the residues of o-hydroxybenzoic acid the polyester may contain equimolar proportions of residues of dihydric phenols and aromatic or cycloaliphatic dicarboxylic acids. Typical dicarboxylic acids include acids of formula:

HOOC—X—COOH wherein X may be a radical selected from 1,4-phenylene, 1,3-phenylene, 1,2-phenylene, 5-sulpho-1,3-phenylene, 2-chloro-1,4-phenylene, 2-bromo-1,4-phenylene, 2-methyl-1,4-phenylene, 2,6-dimethyl-1,4-phenylene, 1,4-cyclohexylene, 4,4-biphenylene, 2,6-naphthalene, 4,4-biphenylene, ethylene dioxybis(1,4-phenylene) and radicals in which X may be:

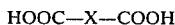

where W is —O—, —SO$_2$— or —C(CH$_3$)$_2$—.

It is preferred that at least one of the dicarboxylic acids is one of the cheaper, readily available acids, particulary terephthalic acid and including isophthalic acid, 2,6-naphthalene dicarboxylic acid and ethylenedioxy-4,4'-dibenzoic acid.

Suitable dihydric phenols are of formula:

—O—Y—O wherein Y is a divalent aryl radical comprising one or more fused or separate aromatic rings. Typical radicals include those in which Y is 1,4-phenylene, 4,4'-biphenylene, 2,6-naphthalene, chloro, bromo, methyl, 2,6-dichloro, 2,6-dimethyl-1,4-phenylene or chloro-4,4'-biphenylene, 3,5',5,5'-tetra alkyl-4,4'-biphenylene and units of formula:

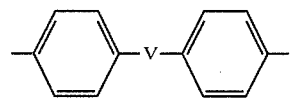

where V is —O—, —C(CH$_3$)$_2$—, or —SO$_2$.

Yet again the copolyester of the invention may comprise units derived from dihydric phenols, aromatic or cycloaliphatic dicarboxylic acids, hydroxyaryl carboxylics in which the hydroxyl and carboxyl groups are separated by at least three carbon atoms together with the units of formula:

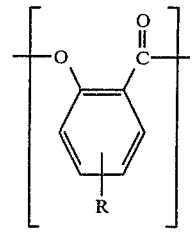

In such compositions the property of forming anisotropic melts without the application of shear is not obtainable with such high molar concentrations of the o-substituted material as in the p-oxycarboxy:o-oxycarboxy polyester described above. The anisotropic melt property as observed in a melt at rest may disappear when the molar concentration of the o-substituted material exceeds about 30 mole % although anisotropic melts may be observed in the same composition if shear is applied to the melt. In practical terms the need to apply shear is no great disadvantage because shear is invariably applied in some form during the fabrication of shaped articles. Typical of the latter type of copolyester are copolyesters containing residues of o-hydroxybenzoic acid, p-hydroxybenzoic acid, terephthalic acid, isophthalic acid and 4,4'-isopropylidene diphenol.

The invention also includes copolyesters containing minor amounts, not exceeding 20 mole % of aliphatic dicarboxylic acids or glycols.

The polyesters of the invention may be prepared by procedures known to those skilled in the art. Typical polyester-forming reactants may have carboxylic acid, hydroxyl, ester or acid halide groups as functional reactive groups. A preferred method is the use of reactions involving a lower acyl ester of the o-hydroxybenzoic acid. A particularly preferred reactant is acetyl salicylic acid because this is available in a high state of purity at relatively low cost. Other suitable reactants are the cyclic esters of the respective o-hydroxy aromatic carboxylic acids, for example, disalicylide, trisalicylide or di-o-cresotide.

The copolyesters of the invention are suitable for fabrication into shaped articles such as fibres, films and moulded articles. The low viscosity of the polymers in the liquid crystal form ensure that the fabrication can be readily carried out without the need to resort to severe conditions or techniques such as compression moulding. The lower melting points resulting from the presence of the o-substituted material ensures that processing can be effected at a lower temperature than similar polyesters not containing the o-substituted material.

The polyesters of the invention particularly those containing substantial amounts of residues of o-hydroxybenzoic acid are susceptible to decomposition at elevated temperatures and care should be exercised when fabricating articles from melts of the polyesters to minimise decomposition by using the lowest appropriate processing temperatures.

For use in moulding applications, compositions containing the copolyester together with particulate or reinforcing fillers may be prepared. The purpose of such composition not only reduces the cost of the material but may also enhance one or other of the physical and mechanical properties of the copolyester. For example, increased tensile strength and flexural modulus may be obtained by including 5 to 80%, preferably 15 to 50%, by volume of the composition of a reinforcing filler such as glass fibre. Other suitable fibrous fillers include asbestos, aluminium silicate fibres and synthetic polymeric fibres. Particulate fillers such as kaolin, chalk, silica, glass ballottini may also often be used to advantage. The increase in melt viscosity brought about by the presence of filler may often usefully be offset by the low viscosity associated with the anisotropic melt.

The invention is further illustrated by reference to the following Examples.

EXAMPLE 1

A series of copolyesters were prepared by the polycondensation of acetyl salicylic acid (ASA) and p-aceotxybenzoic acid (pABA). The procedure used was to charge the reactants to a 100 ml 3-necked glass flask fitted with a nitrogen inlet, a stirrer and a condenser and receiver. The flask was placed in a metal bath at 280° C. which was raised to 325° C. over the course of the reaction. The apparatus was purged with nitrogen before heating. A vacuum of 0.5 mm of mercury was applied after the initial evolution of volatile products. Reaction periods of about 1 hour were used. At the end of the reaction period the products were cooled under nitrogen.

Table 1 lists the various concentrations of reactants employed and observations on the liquid crystal behaviour of melts of the products obtained.

TABLE 1

| Run | Reactants | Mole % | Melt behaviour |
|---|---|---|---|
| A | ASA/pABA | 25/75 | Melting at about 250° C. to form slightly translucent melt which completely depolarised light. Maintained this behaviour up to about 300° C. |
| B | ASA/pABA | 40/60 | Melting at 165° to 175° C. to form slightly translucent orange melt which completely depolarised light up to 320° C. |
| C | ASA/pABA | 50/50 | Melting at about 200° C. to form a liquid crystal depolarising melt. The degree of depolarisation increased markedly under slight shear. |
| D | ASA/pABA | 75/25 | Melting at about 200° C. to form a clear isotropic melt. Under shear the melt depolarised light to a slight extent. |
| E | ASA/pABA | 10/90 | Melting at 335° C. with evidence of some depolarisation. |

The procedure used to examine the melt behaviour of the products was as follows. A sample on a glass slide was placed on a hot plate set at a temperature of about 10° C. higher than the expected melting point (previously determined very roughly). A cover slide was placed on the sample and a pressure of about 5 kg applied. A film with a thickness of 10 to 30 microns was obtained which was cooled immediately. The sample was reheated at 16° C./min whilst the edge of the film was observed between cross-polarisers. The melting temperature was taken as the temperature at which the sharp edges of film start to become rounded and on slight hand pressure the boundaries of the melt were observed to flow.

The melting points obtained do not form a consistent pattern. This is believed to be due to the fact that the residue formed from acetyl salicylic acid is labile at the temperature used for the polymerisation. The materials produced therefore have a composition which does not conform to the charged mole ratio and depends on the equilibrium conditions set up during the polymerisation.

Polyesters of similar composition were also prepared using the conventional interfacial polymerisation method from mixtures of the respective acid chlorides.

EXAMPLE 2

A series of copolyesters were prepared from acetyl salicylic acid (ASA), p-acetoxybenzoic acid (pABA), the diacetate of 4,4'-isopropylidene diphenol (BPA), terephthalic acid (TA) and isophthalic acid (iPA). The molar proportions of ingredients used are detailed in Table 2. The procedure followed was as used in Example 1.

TABLE 2

| Run | Reactants | Mole % | Melt behaviour |
|---|---|---|---|
| E | ASA/pABA/BPA/TA/iPA | 6.5/58.5/17.5/7.0/10.5 | Melted at about 250° C. showing liquid crystal melt at rest. Melt stable up to 300° C. with evidence of isotropic melt at 340° to 350° C. (as shown by appearance of a dark field). |
| F | ASA/pABA/BPA/TA/iPA | 25/60/7.5/3.0/4.5 | Melting at about 235° C. showing typical nematic liquid crystal melt up to at least 320° C. |
| G | ASA/pABA/BPA/TA/iPA | 32.5/32.5/17.5/7.0/10.5 | Melting at 220° C. with no evidence of liquid crystal formation at rest but very strongly depolarised light when subjected to slight shear. |

It was observed that the polymer melt from the preparation of Run G could be drawn out into very tough fibres by dipping a rod into the melt and withdrawing it. The polymer was also pressed at a temperature of 320° C. and 10 tons pressure into a transparent brittle golden yellow film.

COMPARATIVE EXAMPLE A

In a comparative example containing the ingredients of Example 2 except in that the acetyl salicylic acid was omitted a polymer was produced using 65 mole % p-acetoxybenzoic acid, 17.5 mole % of the diacetate of 4,4'-isopropylidene diphenol, 10.5 mole % of terephthalic acid and 7.0 mole % isophthalic acid. The polymer produced melted at 275° C. to a clear anisotropic liquid crystal melt at rest. The degree of depolarisation increased under slight shear and the melt remained anisotropic up to at least 320° C.

We claim:

1. An aromatic polyester characterised in that it is capable of forming an anisotropic melt and contains 5 to 75 mole % of recurring units of formula:

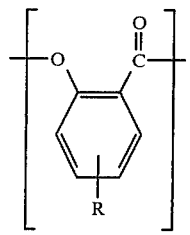

wherein R may be hydrogen, chlorine, bromine or alkyl groups containing from 1 to 4 carbon atoms.

2. An aromatic polyester according to claim 1 in which the units other than the oxycarboxyphenyl residues comprise equimolar proportions of residues of dihydric phenols and aromatic and/or cycloaliphatic dicarboxylic acids.

3. An aromatic polyester according to claim 2 wherein the acids are of formula:

HOOC—X—COOH wherein X may be a radical selected from 1,4-phenylene, 1,3-phenylene, 1,2-phenylene, 5-sulpho-1,3-phenylene, 2-chloro-1,4-phenylene, 2-bromo-1,4-phenylene, 2-methyl-1,4-phenylene, 2,6-dimethyl-1,4-phenylene, 1,4-cyclohexylene, 4,4-biphenylene, 2,6-naphthalene, 4,4-biphenylene, ethylene dioxybis(1,4-phenylene) and radicals in which X may be:

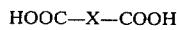

where W is —O—, —SO$_2$— or —C(CH$_3$)$_2$— and the dihydric phenols are of formula:

—O—Y—O— wherein Y is a divalent aryl radical comprising one or more fused or separate aromatic rings selected from 1,4-phenylene, 4,4'-biphenylene, 2,6-naphthalene, chloro, bromo, methyl, 2,6-dichloro, 2,6-dimethyl-1,4- phenylene or chloro-4,4'-biphenylene, 3,5',5,5'-tetra alkyl-4,4'-biphenylene and units of formula:

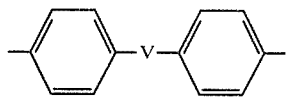

where V is —O—, —C(CH$_3$)$_2$—, or —SO$_2$.

4. An aromatic polyester according to claim 2 in which the units other than the oxycarboxyphenyl residues include residues of hydroxyaryl carboxylic acids in which the hydroxyl and carboxyl groups are separated by at least three carbon atoms.

5. An aromatic polyester according to claim 1 in which the polyester consists solely of recurring units of formula:

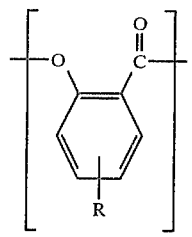

and residues of other hydroxyaryl carboxylic acids of formula:

HO—A—COOH wherein A is a divalent aryl radical comprising one or more fused or separate aromatic rings and wherein the hydroxyl and carboxyl groups are separated by at least three carbon atoms.

6. An aromatic polyester according to claim 5 in which the hydroxyl and carboxyl groups of the acid of formula:

HO—A—COOH are in para relationship in single or multi-ring systems and have their valences parallel and oppositely directed in condensed ring systems.

7. An aromatic polyester according to claim 5 consisting of recurring units of formulae:

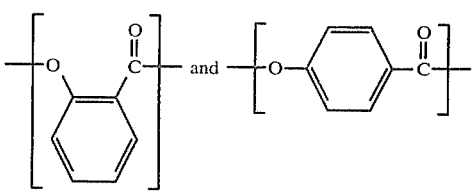

wherein the mole ratio of ortho-substituted residues to para-substituted residues is between 5:95 and 75:25.

8. An anisotropic melt of the aromatic polyesters according to claim 1.

9. A shaped article formed from an anisotropic melt according to claim 8.